Dec. 29, 1959  G. B. PARSONS  2,919,046
SHOCK MOUNTING SYSTEM FOR PACKAGING
Filed June 27, 1956
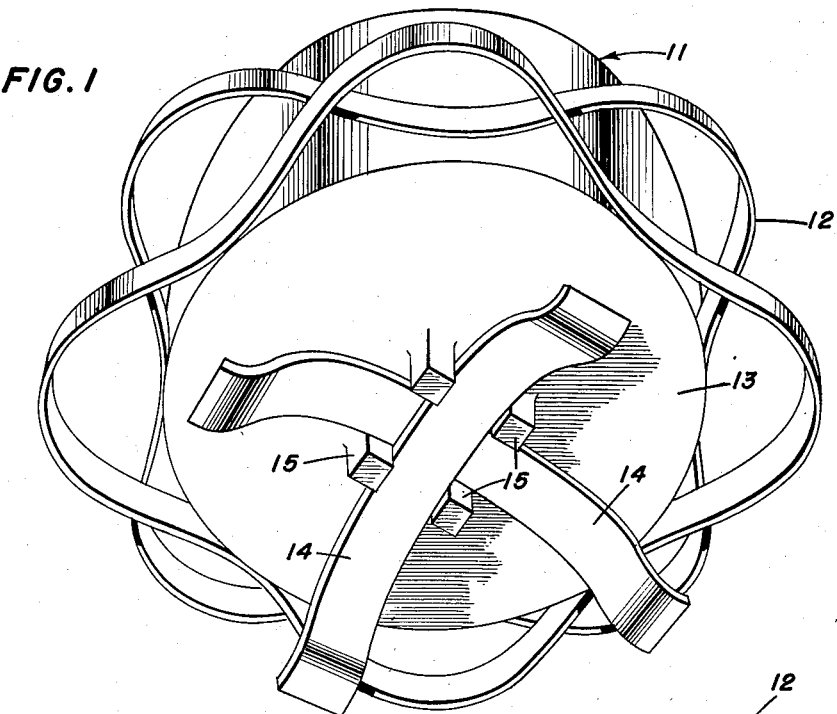
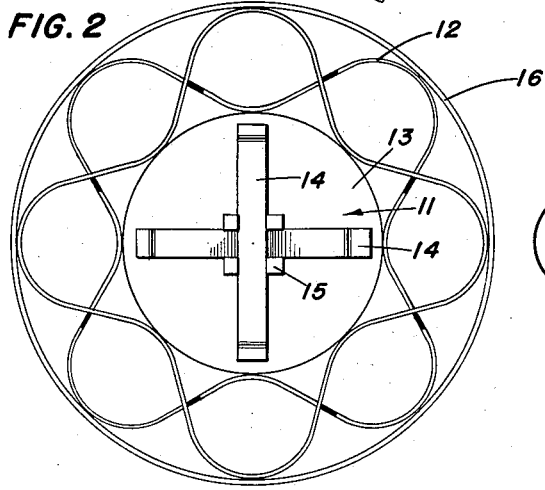
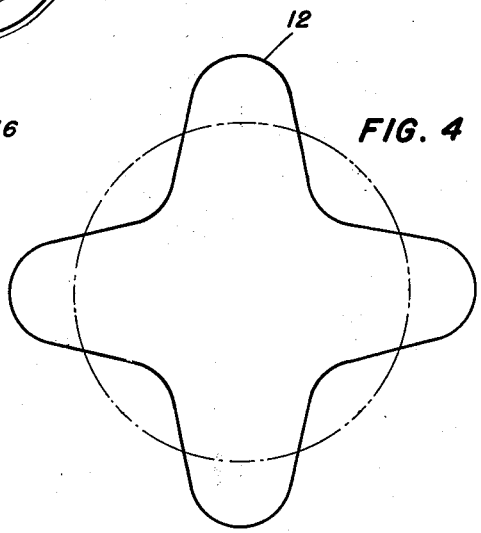
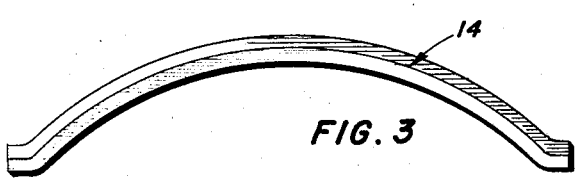
INVENTOR
GEORGE B. PARSONS
BY
ATTORNEYS United States Patent Office 2,919,046
Patented Dec. 29, 1959

2,919,046

SHOCK MOUNTING SYSTEM FOR PACKAGING

George B. Parsons, Cahoonzie, N.Y., assignor, by mesne assignments, to the United States of America as represented by the Secretary of the Navy Application June 27, 1956, Serial No. 594,338

1 Claim. (Cl. 220—15)

The present invention relates to a shock mounting system for packaging and more particularly to a shock mounting system for packaging fragile missile components in suspension to resist in-transit vibration and shock.

Known shock mounting systems to damping vibration and shock generally employ rubber shear pads, rubber compression pads, metallic coil and leaf springs, rubberized hair, excelsior, cotton and other low weight dunnage materials. These systems are disadvantageous from several aspects; for example, shock absorbing material malfunctioning at low temperatures and at elevated temperatures, poor energy efficiencies, liability to fungus and rodent attack, and heaviness and complexity of the structural features of the systems.

The present invention affords a means of shock mounting fragile components in transit by the provision of a system incorporating an inner and an outer circular container and preloaded sinusoidal springs of fiberglass reinforced plastic mounted within the space between the respective containers. The material utilized in forming the shock mounting elements of the present invention and the novel functional design of the elements obviate the afore-mentioned disadvantages apparent in present shock mounting systems.

An object of the present invention is the provision of a shock mounting system for packaging having a high percentage of energy efficiency.

Another object is to provide shock mounting elements which enable vibration damping of forces occurring against the package at different attitudes to be accomplished with lightweight material shaped in novel functional designs.

A further object of the invention is the provision of a shock mounting system which is preloaded to lessen shocks and to dampen vibration.

Still another object is to provide shock elements easily adaptable for use on packages of varying shapes and weights without the necessity of special fitting members.

Other objects and many of the attendant advantages of this invention will be readily appreciated as the same becomes better understood by reference to the following detailed description when considered in connection with the accompany drawings in which like reference numerals designate like parts throughout the figures and wherein:

Fig. 1 illustrates a perspective view of shock mounting elements, which form the preferred embodiment of the present invention, mounted on an inner container;

Fig. 2 shows an end view of the complete shock mounting system as viewed through the opened end of the outer container;

Fig. 3 is a side elevational view of one of the arched shock mounting elements; and Fig. 4 shows a plan view of the sinusoidal shaped shock mounting element of the assemblage shown in Fig. 1 and drawn on a circular construction line.

There is shown in Fig. 1, which illustrates a preferred embodiment, an inner container 11 having preloaded sinusoidal springs 12 composed of fiberglass reinforced plastic mounted on the outer surface of the container and adjacently spaced along the longitudinal axis of the container. At the end or bottom cover 13 of the inner container 11 are positioned end springs 14 shaped in the form of arches and attached at their crown to the end 13 by means of upstanding lugs 15. The opposite end or top cover (not shown) of container 11 is similar in construction to the bottom end or cover 13, and has similar springs 14 and lugs 15.

The sinusoidal springs 12 are frictionally engaged on the outer surface of the container 11; however, as an alternate method of construction, the sinusoidal springs 12 could be split into separate nodes, and the springs could be held in their correct peripheral location on the surface of the container by suitable mechanical means. For example, this might be accomplished by placing an inner and an outer race on the spring system, thereby allowing the spring system either to be removed with the inner container or to be left in place as desired.

As shown in Fig. 2 the assembled shock mounting system is comprised generally of an outer container 16 within which between top and bottom ends or covers of the outer container, is coaxially positioned the inner container 11 of Fig. 1. The sinusoidal springs 12 and arch springs 14 are preloaded in their assembled position between the inner and outer containers. By the method of preloading a change is effected in the load deflection curve at the point of preloading, thereby inherently affording a means of vibration damping. In addition, the form of the spring is such that the load deflection curve results in an S shape, quite steep at the beginning, relatively flat for a large portion of its deflection, and then again steeply rising for the last portion. By the method of preloading the arched fiberglass reinforced plastic springs 14 and the sinusoidal springs 12 a high percentage of energy efficiency is accomplished, and abrupt bottoming of the inner container against the outer container is usually not experienced, even though the package is dropped from a height exceeding the average specification height. More specifically, the energy absorbed by deflection of the spring proper is additive to certain friction forces created by preloading the springs, these friction forces being additive over the entire deflection range. Thus, the friction forces again add to the efficiency of the shock mounting system.

The shock mounting system of the present invention has operated with little differential over a temperature range of $-70°$ to $+160°$ F. The present invention contemplates the use of fiberglass reinforced plastic springs because of the inherent favorable characteristics of this material. To illustrate, steel has a modulus elasticity of 30 million p.s.i. and beryllium copper has a modulus elasticity of 16 million p.s.i.; in comparison fiberglass has a modulus elasticity of 5 million p.s.i. as fabricated and a tensile strength and flexure strength comparable to steel. Therefore, it has been found that a spring of this type can be made many times more narrow in dimension than could a spring of steel, although the thickness possibly will be greater, and, therefore, the tensile strength of the spring is increased. Similarly, since laminated fiberglass weighs approximately one-quarter of the weight of steel, considerable weight saving is accomplished for airline shipment or other shipments where weight is a significant factor. Furthermore, the material of which the springs 12 and 14 are composed is completely fungus inert and rodent proof.

In practical usage the shock mounting system of the instant invention allows the inner container to move toward the outer container when the complete container as shown in Fig. 2 is dropped on a hard surface. The movement of the inner container 11 in relation to the outer container 16 deflects the preloaded sinusoidal springs 12 if the containers are dropped on the side for example, or the preloaded end springs are deflected if the entire assemblage is dropped on an end, or a combination of the two deflections if the system is dropped in an intermediate attitude. Since the load deflection curve is not a straight line but rather an S shape, the amount of deflection required to absorb the energy of the inner container is exceedingly low.

The sinusoidal spring element 12 as shown in Fig. 4 is composed of an endless strip of fiberglass reinforced plastic material, and the design is a repeated sinusoidal curve. Their peak amplitudes may be considered as 270° nodes of a curve approximating a sine wave bent into an endless form. The individual shock mount elements as illustrated in Fig. 4 may be mounted on an inner container in the manner shown best in Fig. 1 wherein is illustrated a series of springs 12 frictionally engaged on the surface of container 11. The peak amplitudes or crests of the individual springs 12 are positioned adjacently with a similar spring along the longitudinal axis of the inner container 11 in such a manner that the peak amplitude or crest of one spring curve is in longitudinal alignment with the reverse curve or trough of the adjoining spring member. In this fashion maximum frictional engagement exists between the inner and outer container and the springs 12 interposed therebetween, as shown in Fig. 2.

The arch springs 14 of Fig. 3 are fixedly engaged to the end 13 of the inner container 11 at 90° to each other; that is, the maximum point of each of the arch springs is nested one on the other with one spring being perpendicular to the other arch spring.

The fiberglass reinforced plastic springs have been processed into the shapes described hereinbefore and shown in the drawings by a process which is well-known in the plastic industry. Rovings, which consist approximately of 205 glass filaments or strands placed side-by-side in parallel position, are passed through a vat of resin to which is added an exothermic catalyst. A variety of thermosetting plastics have been found useful in the manufacture of the present invention, among them being compounds such as the polyesters or epoxy resins or both, melamines, the phenolic and polyethylene resins, and nylon. The rovings when passed through the vat of resin are approximately the size of an ordinary cotton string, and after passage through the vat of resin the rovings are caused to proceed through a series of rollers where any excess of the thermosetting resin covering the rovings is removed. While still in a plastic state, the rovings are wound onto a reel having a collapsible center, the number of windings defining the thickness as well as the width of the endless strips used in the present invention for spring material. For example, about 400 yards of the resin coated rovings are used to make a strip ⅛ to 3/16 inch thick by 4 to 5 inches wide. After being wound on the reel to the desired thickness and width the material is compressed by matching male and female dies which form segments of circles, these dies being inserted within the reel structure adjacent the windings of the plastic material. The center portion of that sector occupied by the die block is collapsed to allow the rovings to conform to the outer periphery of the segmented block or die. The convoluted spring of Fig. 4 is fashioned by using dies within the center of the collapsible reel so as to define four nodes and four antinodes. Following the compression of the material by the mating dies into the sinuous shape required, the completed form is placed into an oven for curing under heat treatment. The time and temperature of heat treatment is scheduled relative to the chemical composition of the selected thermosetting resin employed, as can be well understood.

The present invention is contemplated for use in packaging highly fragile equipment such as guided missiles, and has inherent shock absorbing qualities far superior to known shock mountings. The designs of the springs of the present invention are such that a missile or package may be suspended within a container with the springs in a preloaded condition so as to render the energy absorbing efficiency of the mountings very high. Further, the coefficient of friction of the spring material and the arrangement of forced fit of the springs within an outer container and over an inner container results in a high total coefficient of friction.

Obviously many modifications and variations of the present invention are possible in the light of the above teachings. It is therefore to be understood that within the scope of the appended claim the invention may be practiced otherwise than as specifically described.

What is claimed is:

A shock mounting system for packaging fragile material comprising an inner cylindrical container having a top and a bottom, an outer container having a top and bottom and surrounding, and in spaced relation with respect to the inner container, shock damping means disposed within the space between the inner and outer containers, said shock damping means including a plurality of endless corrugated springs of sinusoidal shape surrounding the inner container and lying in a plane normal to the longitudinal axis thereof, each of said endless corrugated springs being preloaded into frictional engagement at its alternate troughs and crests with the inner and outer containers respectively, each spring being offset from the one adjacent thereto an amount sufficient to position the crest thereon in opposition to the trough of the adjacent spring whereupon the crests and troughs of the springs are aligned along the inner and outer containers to produce a staggered resilient supporting arrangement for said inner container and a plurality of arch-shaped preloaded springs interposed between respective bottoms and tops of said containers in the space provided therebetween, the crowns of said arch-shaped preloaded springs intersecting at right angles to one another in a plane parallel to the plane of said endless corrugated springs with the free ends of the springs in engagement with their respective top and bottom of the outer container and said crowns in proximate relation with respect to their respective top and bottom of the inner container and a plurality of depending lugs integral with and extending from the top and bottom of said inner container in engagement with their respective plurality of arch-shaped springs substantially at the crowns thereof for releasably attaching and maintaining the arch-shaped springs in position on the top and bottom of the inner container whereby said preloaded corrugated and arch-shaped springs resiliently support the inner container in spaced relationship with the outer container.

References Cited in the file of this patent

UNITED STATES PATENTS

| 449,326 | Kennedy et al. | Mar. 31, 1891 |
| 719,527 | Steel | Feb. 3, 1903 |
| 1,663,032 | Wetmore | Mar. 20, 1928 |

FOREIGN PATENTS

| 525,337 | Germany | May 22, 1931 |
| 720,875 | France | Dec. 12, 1931 |